US009892599B2

(12) United States Patent
Tam

(10) Patent No.: US 9,892,599 B2
(45) Date of Patent: Feb. 13, 2018

(54) SYSTEMS AND METHODS FOR PROVIDING A FEATURE GAME

(71) Applicant: Aristocrat Technologies Australia Pty Limited, North Ryde (AU)

(72) Inventor: Billy Tam, East Killara (AU)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 188 days.

(21) Appl. No.: 14/821,504

(22) Filed: Aug. 7, 2015

(65) Prior Publication Data

US 2016/0042593 A1 Feb. 11, 2016

(30) Foreign Application Priority Data

Aug. 10, 2014 (AU) ................................ 2014903103

(51) Int. Cl.
*G06F 17/00* (2006.01)
*G07F 17/34* (2006.01)
*G07F 17/32* (2006.01)

(52) U.S. Cl.
CPC .......... *G07F 17/34* (2013.01); *G07F 17/3267* (2013.01)

(58) Field of Classification Search
USPC ...................................................... 463/16–25
See application file for complete search history.

(56) References Cited

U.S. PATENT DOCUMENTS 8,771,055 B2 * 7/2014 Penacho ............... G07F 17/326 463/20
2008/0102928 A1 * 5/2008 Daley ..................... G07F 17/34 463/20
2012/0122583 A1 * 5/2012 Alexiadis ............ G07F 17/3258 463/40
2012/0304832 A1 * 12/2012 Hitchcock ............. E21B 19/166 81/90.3
2013/0331173 A1 * 12/2013 Jaffe .................. G07F 17/3288 463/21

* cited by examiner

*Primary Examiner* — Ronald Laneau
(74) *Attorney, Agent, or Firm* — McAndrews, Held & Malloy, Ltd.

(57) ABSTRACT

Described herein is a gaming machine and, a method of gaming thereon, comprising: a symbol selector for selecting a plurality of symbols from a set of symbols for display during play of a base game; an outcome evaluator for monitoring play of the base game, wherein a feature game is triggered in response to a trigger event during the base game, the feature game having at least one predefined rule; a rule modifier for modifying said predefined rule in response to a determination that said at least one predefined rule is to be modified before play of said feature game; and a controller for initiating play of said feature game based on the modified rule.

17 Claims, 12 Drawing Sheets

| Free Games | Free Games | Free Games | Free Games | Free Games | Free Games |
|---|---|---|---|---|---|
| | | | | | |
| X5 | X8 | x10 | x15 | X30 | X30 |
| X3 | X5 | x8 | x10 | x15 | x15 |
| | | | | | x10 |

Figure 9B

SYSTEMS AND METHODS FOR PROVIDING A FEATURE GAME

RELATED APPLICATIONS

This application claims priority to Australian Provisional Patent Application No. 2014903103, having a filing date of Aug. 10, 2014, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In existing gaming systems, feature games may be triggered for players in addition to the base game. A feature game gives players an additional opportunity to win prizes, or the opportunity to win larger prizes, than would otherwise be available in the base game. Feature games can also offer altered game play to enhance player enjoyment.

While such gaming systems provide players with enjoyment, a need exists for alternative methods and game controller components to provide feature games in gaming systems.

BRIEF SUMMARY OF THE INVENTION

According to one aspect of the invention there is provided a gaming machine comprising:

- a symbol selector for selecting a plurality of symbols from a set of symbols for display during play of a base game;
- an outcome evaluator for monitoring play of the base game, wherein a feature game is triggered in response to a trigger event during the base game, the feature game having at least one predefined rule; and
- a rule modifier for modifying said predefined rule in response to a determination that said at least one predefined rule is to be modified before play of said feature game;
- a controller for initiating play of said feature game based on the modified rule.

Preferably the set of symbols comprise a plurality standard symbols and at least one trigger symbol, and wherein the trigger event comprises the at least one trigger symbol being selected for display by the symbol selector.

Additionally or alternatively, the trigger event comprises a random determination independent of the at least one trigger symbol.

In an embodiment, the feature game comprises a plurality of selectable play options, each of the plurality of play options being associated with respective ones of a plurality of predefined rules.

The predefined rules of a feature game in this embodiment are each defined by a first component comprising a number of free games and a second component comprising an average prize amount. Modifying a predefined rule comprises modifying at least one of the first component and the second component. Furthermore, modifying the first component comprises adjusting the number of free games comprising the first component; and modifying the second component comprises adjusting the average prize amount.

Further, the average prize amount for each predefined rule is defined at least in part by a plurality of prize multipliers, and wherein adjusting the average prize amount comprises selectively deactivating at least one of said plurality of prize multipliers.

In an embodiment, the determination to modify said at least one predefined rule is randomly implemented after the plurality of symbols have been selected for display. Further, the determination is implemented by selectively superimposing at least one overlay symbol over the plurality of symbols selected for display, wherein the predefined rule is modified in response to the overlay symbol being superimposed over the at least one trigger symbol. In a particular example, the overlay symbol is only superimposed over a predefined location.

In a further embodiment, when a random determination independent of the trigger symbol is triggered, a plurality of selectively revealable objects are displayed, at least one of which, when selectively revealed, triggers both the feature game and the modifying of the predefined rule.

According to another aspect of the invention, there is provided an electronic method of gaming comprising:

- selecting, using a symbol selector, a plurality of symbols from a set of symbols for display during play of a base game;
- monitoring, using an outcome evaluator, play of the base game, wherein a feature game is triggered in response to a trigger event during the base game, the feature game having at least one predefined rule; and
- modifying, using a rule modifier, said predefined rule in response to a determination that said at least one predefined rule is to be modified before play of said feature game;
- initiating, using a controller, play of said feature game based on the modified rule.

According to another aspect of the invention there is provided a computer program code which when executed by components of a controller of a gaming system implements the above method.

According to another aspect of the invention there is provided a tangible computer readable medium comprising the above computer program code.

BRIEF DESCRIPTION OF SEVERAL VIEWS OF THE DRAWINGS

Features and advantages of certain embodiments of the present invention will become apparent from the following description of embodiments thereof, by way of example only, with reference to the accompanying drawings, in which;

FIG. 9B is a mock screen representation of the Super Feature™ game of FIG. 8, showing a selected play option and the predefined rule having been modified.

Figure 1:
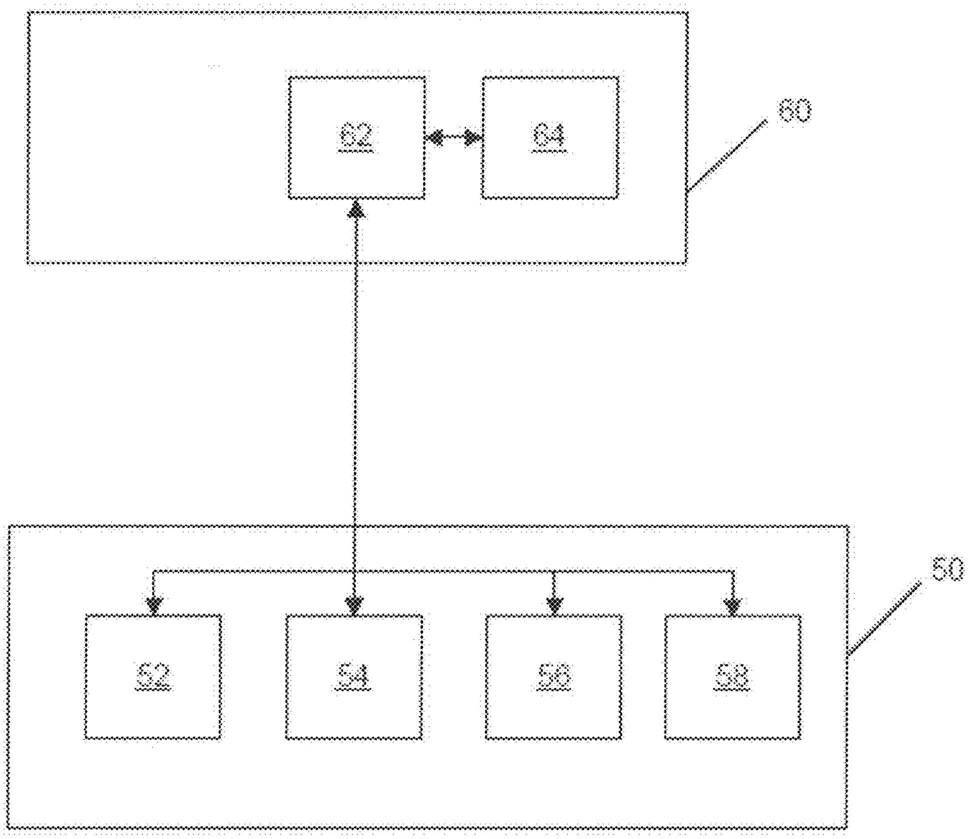
FIG. 1 is a block diagram of the core components of a gaming system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Referring to the drawings, there are shown example embodiments of gaming systems which have components that enable the implementation of a base game, from which is triggered a feature game having a plurality of options to control volatility of the feature game. In these embodiments, there are six selectable options, including a mystery option which selects components defining volatility of the feature game at random. The invention is not limited to providing only six volatility options, however. In other embodiments, any number of volatility options may be provided when the feature game is triggered.

In the preferred embodiment, the return to player (RTP) remains constant regardless of which of the six volatility options are selected. However, in alternative embodiments the overall RTP of the gaming system may be altered based on the volatility option that is selected for play.

General Construction of Gaming System

The gaming system can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Irrespective of the form, the gaming system 1 has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
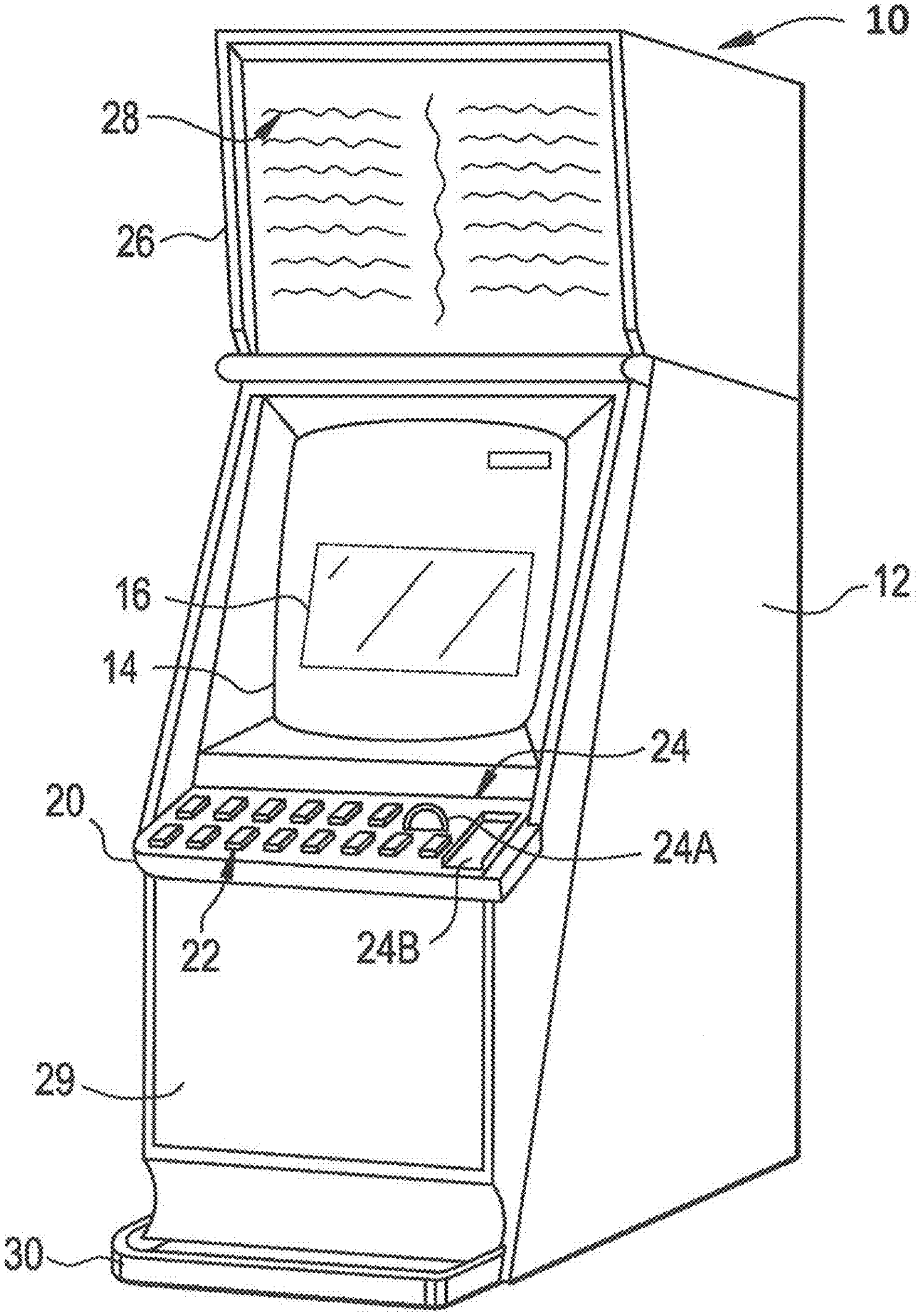
FIG. 2 is a perspective view of a standalone gaming machine.

A gaming system in the form of a standalone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
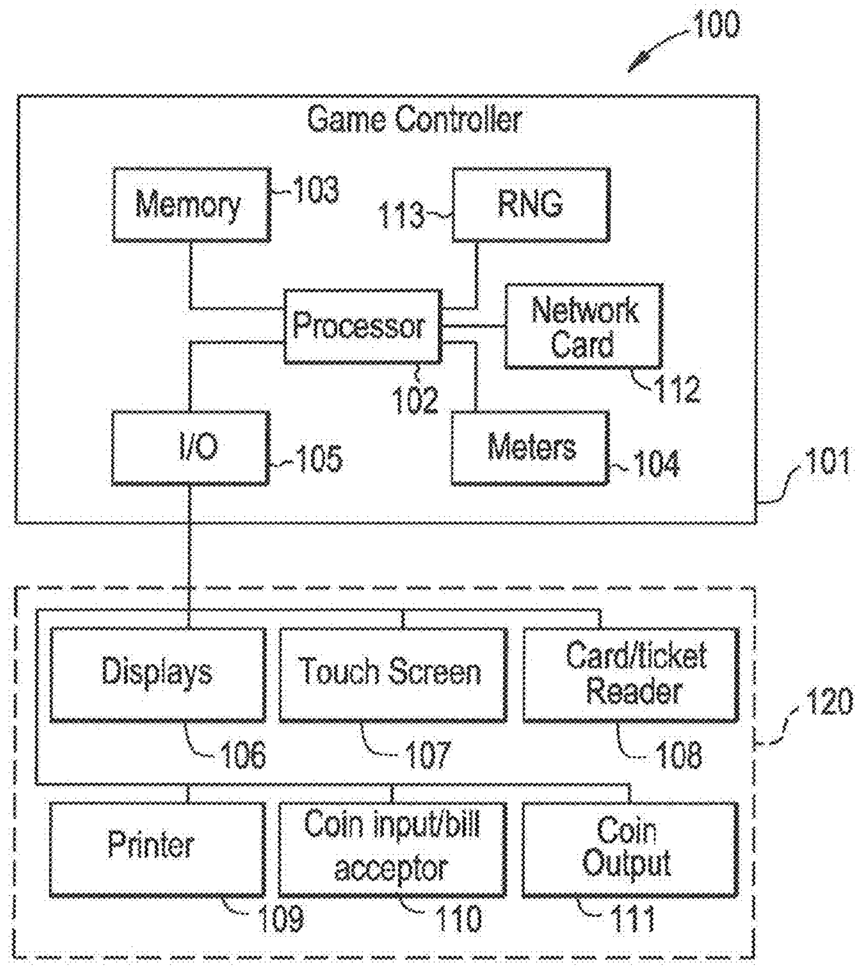
FIG. 3 is a block diagram of the functional components of a gaming machine.

FIG. 3 shows a block diagram of operative components of a typical gaming machine which may be the same as or different to the gaming machine of FIG. 2.

The gaming machine 10 includes a game controller 101 having a processor 102 mounted on a circuit board. Instructions and data to control operation of the processor 102 are stored in a memory 103, which is in data communication with the processor 102. Typically, the gaming machine 10 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
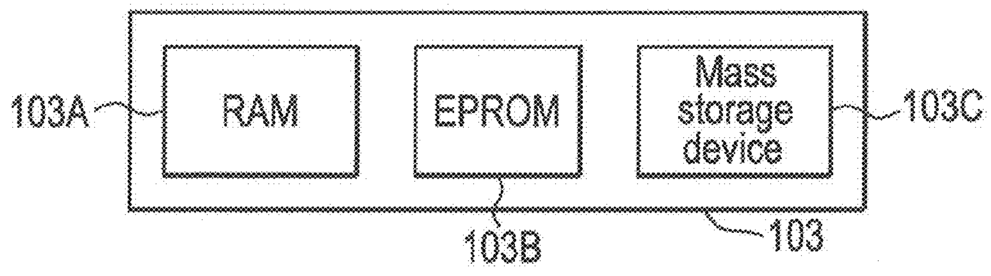
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
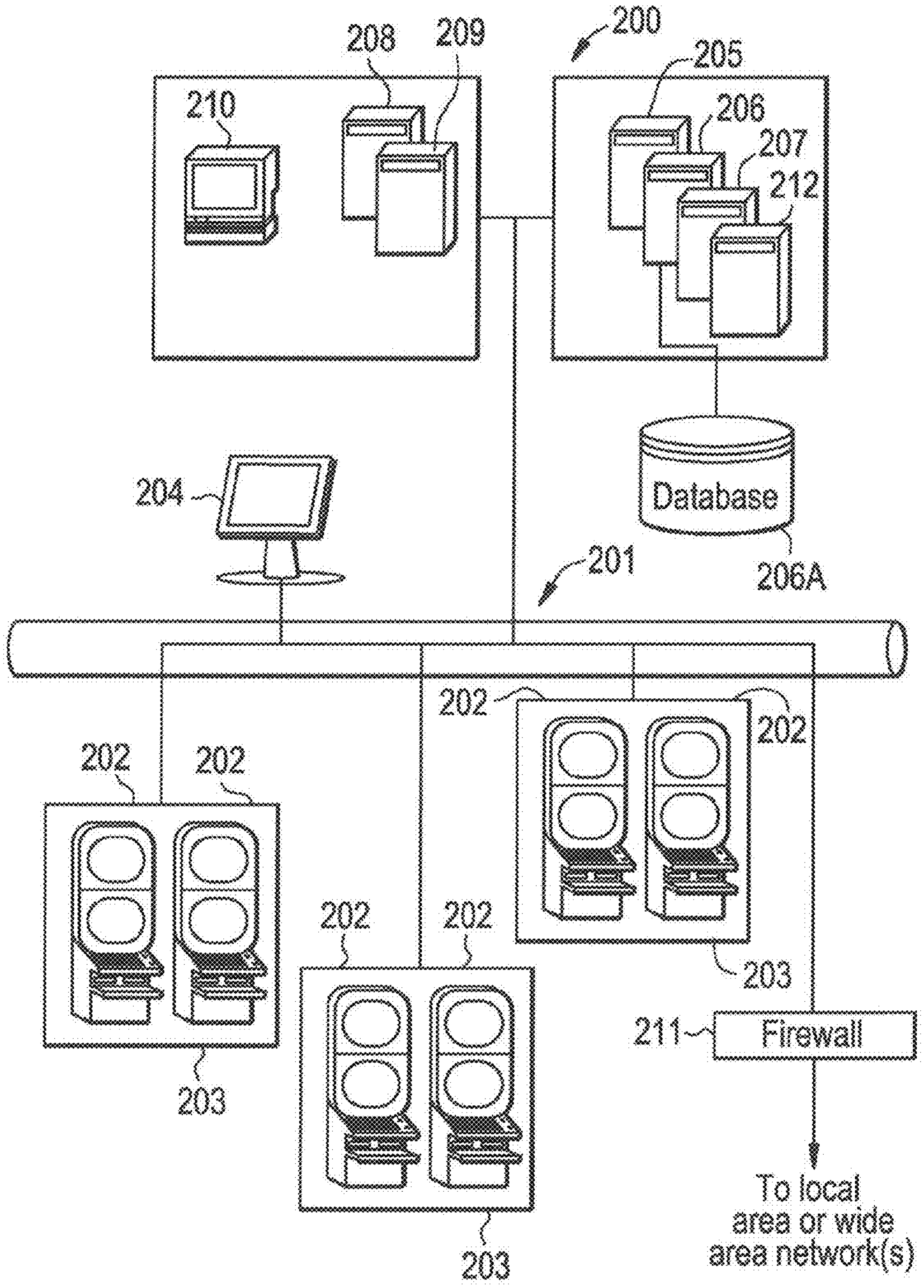
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5 are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

The player operates the game play mechanism 56 to specify a wager and hence the win entitlement which will be evaluated for this play of the game and initiates a play of the game. Persons skilled in the art will appreciate that a player's win entitlement will vary from game to game dependent on player selections. In most spinning reel games, it is typical for the player's entitlement to be affected by the amount they wager and selections they make (i.e. the nature of the wager). For example, a player's win entitlement may be based on how many lines they play in each game—e.g. a minimum of one line up to the maximum number of lines allowed by the game (noting that not all permutations of win lines may be available for selection) and how much they wager per line. Such win lines are typically formed by a combination of symbol display positions, one from each reel, the symbol display positions being located relative to one another such that they form a line.

In many games, the player's win entitlement is not strictly limited to the lines they have selected, for example, "scatter" pays are awarded independently of a player's selection of pay lines and are an inherent part of the win entitlement.

Persons skilled in the art will appreciate that in other embodiments, the player may obtain a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

Figure 6:
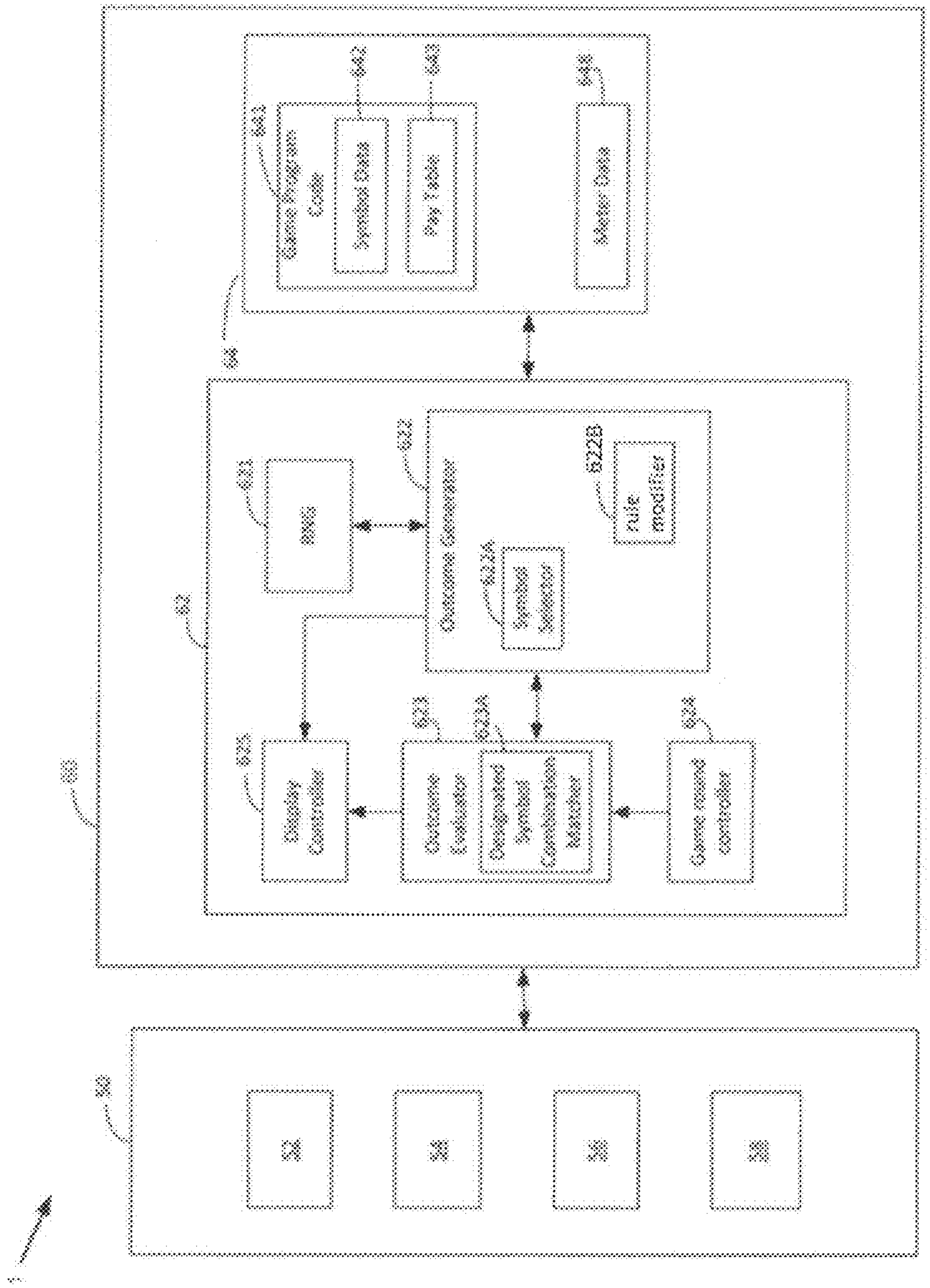
FIG. 6 is a further block diagram of a gaming system.

In FIG. 6, the processor 62 of game controller 60 of gaming system 1 is shown implementing a number of modules based on game program code 641 stored in memory 64. Persons skilled in the art will appreciate that various of the modules could be implemented in some other way, for example by a dedicated circuit.

These modules include the outcome generator 622 which operates in response to the player's operation of game play mechanism 56 to place a wager and initiate a play of the game and generates a game outcome which will then be evaluated by outcome evaluator 623. The first part of forming the game outcome is for a symbol selector 622A to select symbols from a set of symbols specified by symbol data 642 using random number generator 621. The selected symbols are advised to the display controller 625 which causes them to be displayed as a symbol display on display 54 at a set of display positions.

In the embodiment described below, the display positions of the symbol display are arranged in a rectangular matrix comprising a plurality of columns and a plurality of rows. However, in other arrangements as known in the gaming industry could be employed in embodiments of the invention. For example, in some arrangements there are more symbols in some columns than other, such as 3-4-3-4-3 arrangement of seventeen display positions corresponding to respective ones of five reels. In such arrangements, the columns of four symbols can be arranged so that they are off-set or staggered relative to the columns having two symbols so that the middle two symbols in the columns of four symbols share boundaries with two symbols of each neighbouring reel.

In one embodiment, the outcome generator 622 is arranged to generate one or more game outcomes. All outcomes are displayed on display 54 under control of display controller 625. One example of generating a first game outcome is for the symbol selector 622A to select symbols for display from symbol data 641 in the form of a plurality of symbol sets corresponding to respective ones of a plurality of reels. The symbol sets specify a sequence of symbols for each reel such that the symbol selector 622A can select all of the symbols to be displayed for each reel by selecting a stopping position in the sequence. In one example, three symbols of each of five reels may be displayed such that symbols are displayed at fifteen display positions on display 54. It is known to use a probability table stored in memory 64 to vary the odds of a particular stop position being selected. Other techniques can be used to control the odds of particular outcomes occurring to thereby control the return to player of the game.

Once the symbols are selected by the symbol selector 622A of outcome generator 622, they are evaluated by the outcome evaluator 623 to determine whether they include any winning combinations in pay table 643 to determine whether to make an award. Any award is added to the win meter maintained in memory 64 as part of meter data 648. The meter data 648 also includes the current value of a credit meter. The current values of the credit and win meters are displayed on display 54 by the display controller 625. Wins are transferred from the win meter to the credit meter at the end of a play of the game. Wagers are deducted from the credit meter when play of a game commences.

In one embodiment, once symbol selector 622A selects a plurality of symbols for display during play of the base game; outcome evaluator 623 monitors play of the base game to determine whether a feature game is to be triggered in response to a trigger event during the base game. In this embodiment, the feature game has at least one predefined rule, which may be modified using rule modifier 622B. The modifying of the predefined rule is performed in response to a determination that a second trigger event has occurred.

Once the predefined rule is to be modified, controller 60 initiates play of the feature game based on the modified rule.

Figure 7A:
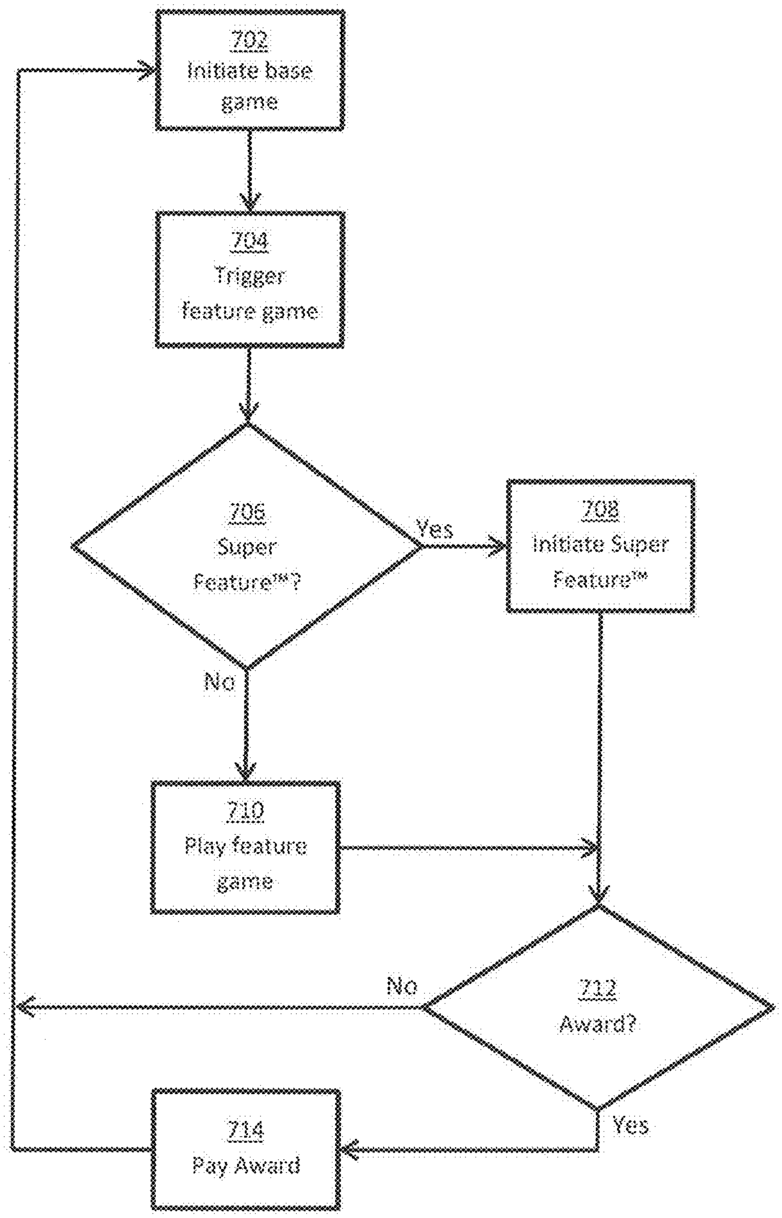
FIG. 7A is a flow diagram of the Super Feature™ game being triggered after a standard feature game is triggered during play of the gaming system of FIG. 1.

This is best illustrated in FIG. 7A, which is a flow diagram showing the operation of the base game. The base game is initiated at step 702, and played in the normal manner as will be known to those skilled in the art.

In an embodiment, if outcome evaluator 623 determines that a trigger event occurs during play, a feature game is triggered at step 704. This embodiment employs a yin yang symbol 802 as the trigger symbol, but of course, the trigger symbol should not be limited to a yin yang symbol, and may include any symbol as appropriate for the theme of the base game. When at least one yin yang symbol 802 is selected for display, the feature game is triggered.

Figure 9A:
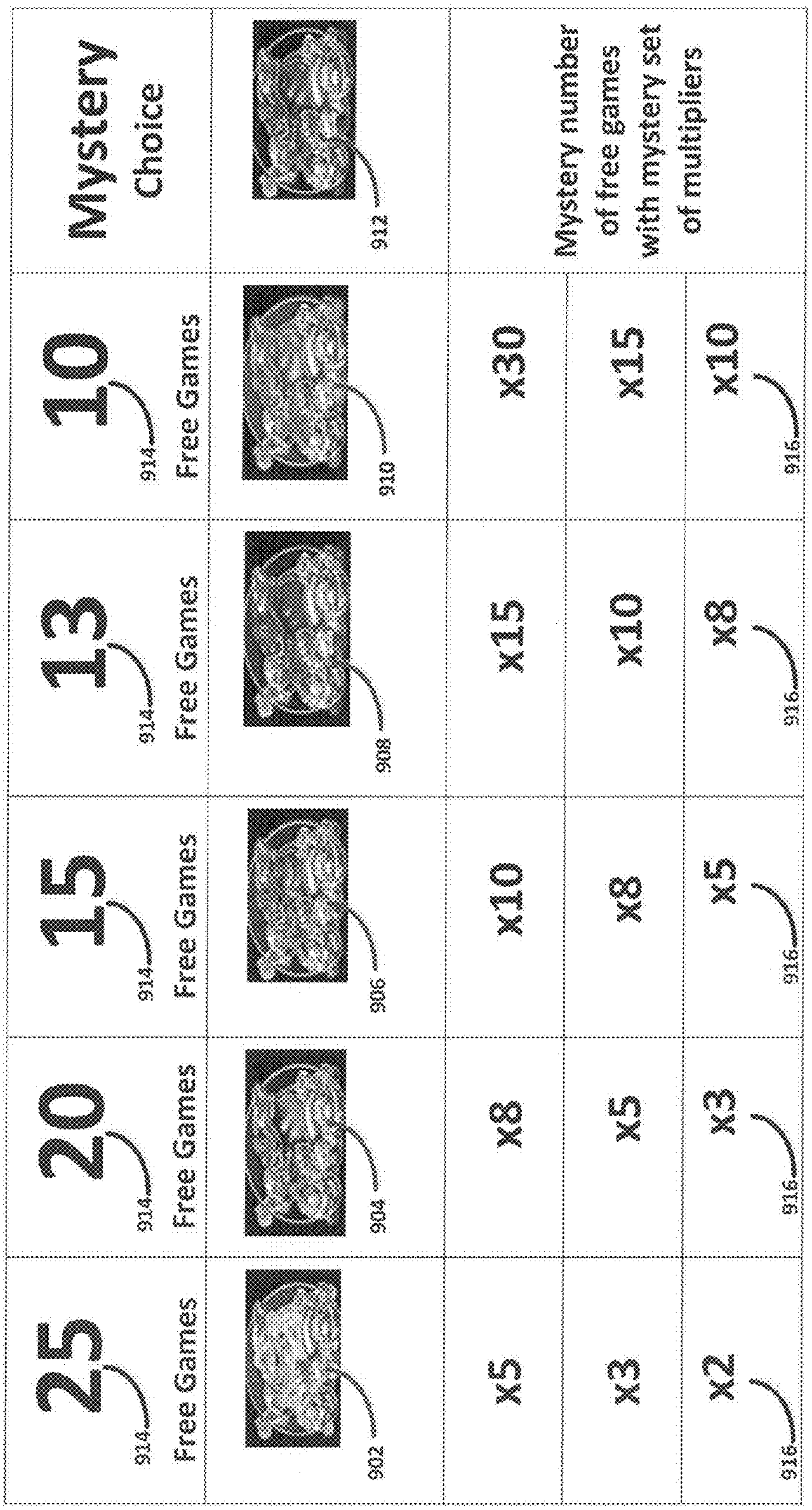
FIG. 9A is a mock screen representation of the Super Feature™ game of FIG. 8, showing a plurality of selectable play options.

In the embodiment, the feature game is of the type which provides a plurality of options to control the volatility of the game, as best shown in FIG. 9A. In this embodiment, a choice may be made from one of six frogs 902-912, each frog being distinguished by a different characteristic. Preferably, the characteristic of the frog is indicative of the volatility of the option. For example, frog 910 indicates the option having the highest volatility (that is, highest average prize but lowest number of free games) and may be distinguished by a diamond characteristic. Similarly, frog 902 indicates the option having the lowest volatility and may be distinguished by a bronze characteristic.

Each of the volatility options indicated by frogs 902-910 are defined by a first component in the form of respective free games counters 914 and by a second component in the form of respective sets of multipliers 916. In this embodiment, the free games counters 914 for the respective options are initially set at 25, 20, 15, 13 and 10 free games, and each the set of multipliers 916 comprise three multipliers ranging from ×2 to ×30. In one embodiment, controller 60 randomly selects one of the three multipliers from the set of multipliers to apply to the selected option. In other embodiments, the player may select the option to apply based on eligibility criteria. For example, one or more multipliers in the set may be greyed out based on the amount wagered, or based on the number of trigger symbols that appeared in the base game to trigger the feature game.

The FIG. 9A embodiment also provides a mystery choice option, indicated by frog 912. When this mystery choice is selected, controller 60 assigns a random number of free games and a random set of multipliers to the feature game.

Figure 8:
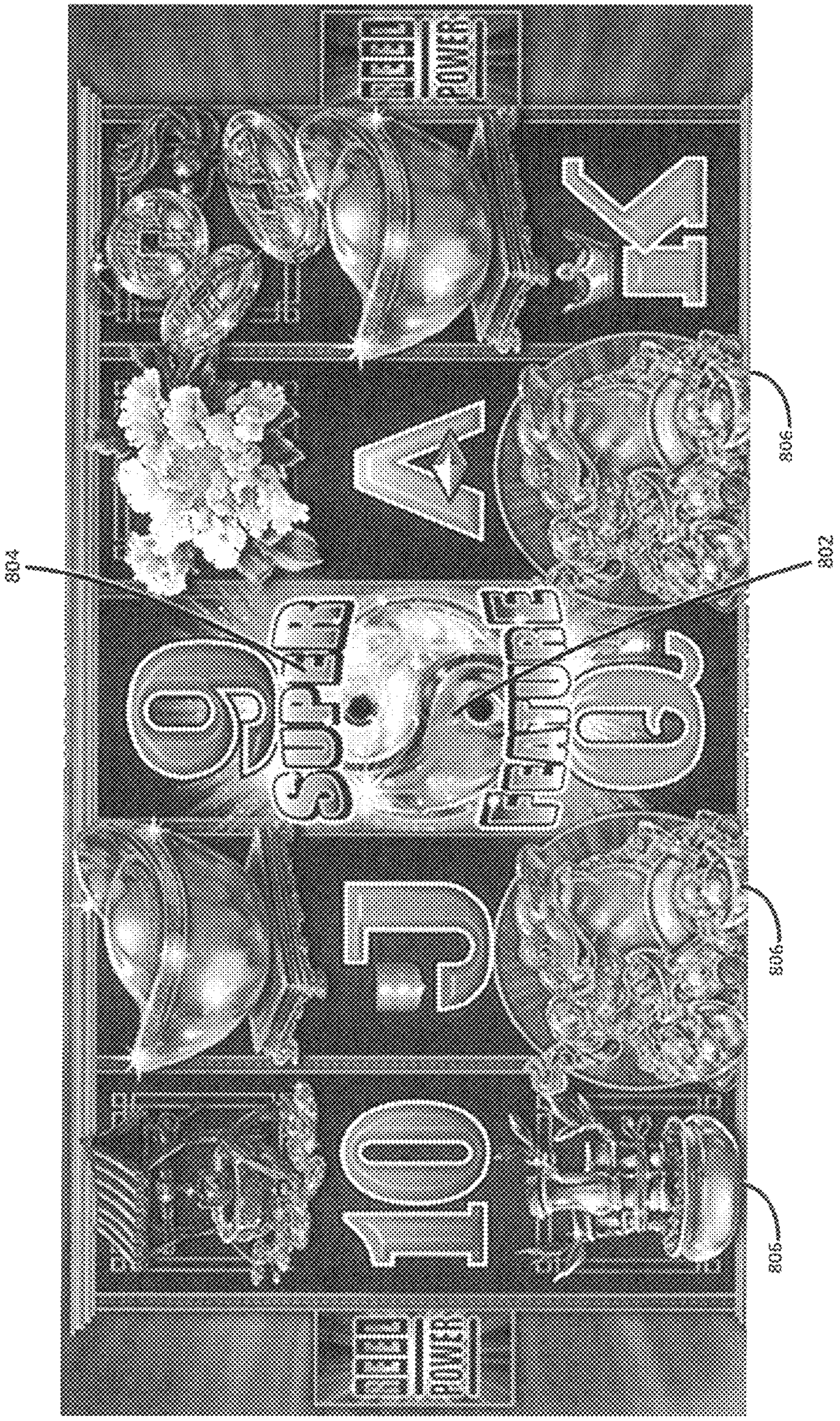
FIG. 8 is a screen representation of the Super Feature™ game being triggered.

Before controller 60 initiates the feature game, the outcome evaluator 623 also determines whether a Super Feature™ game is to be triggered, at step 706. Referring briefly to FIG. 8, the Super Feature™ game is triggered when super feature overlay 804 is superimposed over yin yang symbol 802. That is, in this embodiment, a standard feature game must first be triggered by yin yang symbol 802 before a Super Feature™ game may be triggered by super feature overlay 804.

In the embodiment of FIG. 8, super feature overlay 804 comprises a symbol having a generally annular shape, wherein the outer ring comprises the words "Super Feature". Overlay 804 also has a blank middle portion, which when superimposed upon yin yang symbol 802, allows yin yang symbol 802 to be substantially displayed therethrough. In other embodiments, the overlay symbol may be opaque or semi-opaque and completely or partially obscure the underlying symbol.

In this embodiment, only one yin yang symbol 802 needs to be displayed during the base game for a feature game to be triggered. However in other embodiments, more trigger symbols may be required. For example, a feature game can be triggered by three or more trigger symbols in a scatter configuration or in a predefined win line combination. In such embodiments, the super feature overlay 804 may trigger a Super Feature™ game when it is superimposed upon any of the trigger symbol, or when superimposed upon a specific one of the trigger symbols. In further embodiments, super feature overlay 804 may only trigger a Super Feature™ game if yin yang symbol 802 appears in a predefined location of the display, such as in the middle of the matrix as shown in FIG. 8.

Returning to FIG. 7A, if a Super Feature™ game is triggered, it is played at step 708—which is described below with reference to FIG. 7B. If the Super Feature™ is not triggered, a standard feature game is initiated for play by controller 60 at step 710. In either case, at the end of the standard feature game or the Super Feature™ game, any prize determined to be awarded at step 712 are paid at step 714 and the game ends. The player may then choose to return to step 702 to initiate the base game again.

Figure 7B:
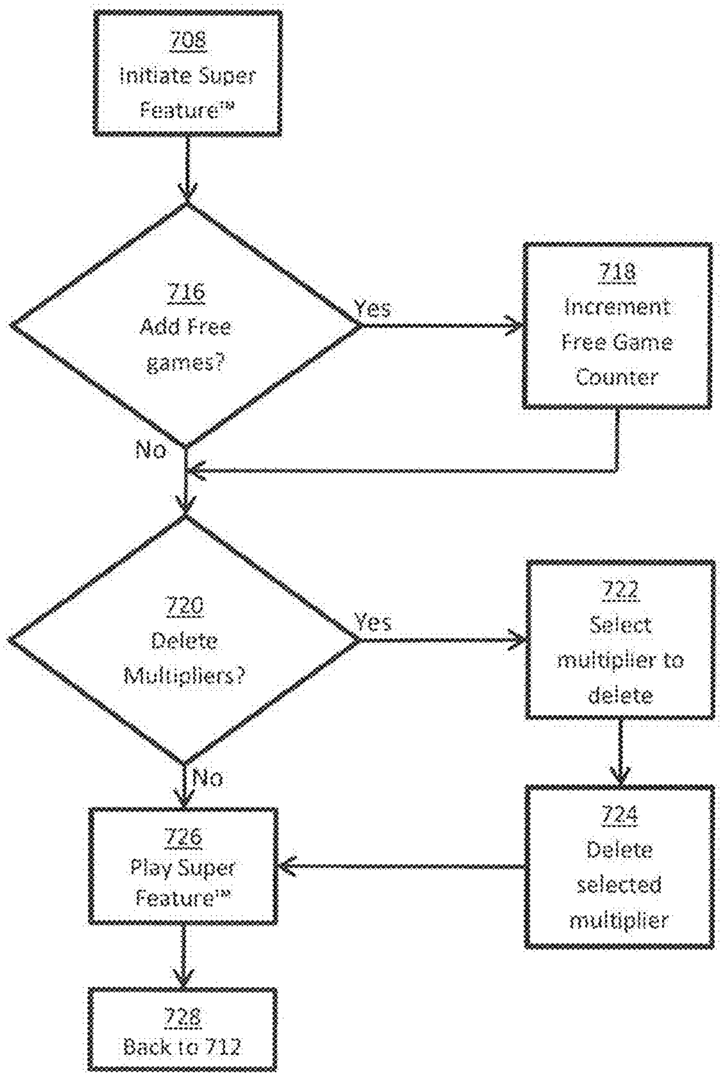
FIG. 7B is a flow diagram of the operation of the Super Feature™ of FIG. 7A.

FIG. 7B shows a flow diagram of an embodiment of the Super Feature™ game. If the Super Feature™ game is triggered for play at step 708. In this embodiment, the Super Feature™ game modifies the standard feature games in two ways:

1) By adjusting the number of free games; and

2) By adjusting the number of multipliers.

Thus, at step 716, rule modifier 622B first determines the number of free games that are to be added to the feature game, and the free game counter is incremented accordingly at step 718. Similarly, at step 720, rule modifier 622B then determines the number of multipliers that are to be deleted, selects the multipliers to delete at step 722, and deletes the multipliers according at step 724. This is best described with reference to FIGS. 9A and 9B.

When a trigger game is triggered by outcome evaluator 623, the selection screen of FIG. 9A is displayed and one of the volatility options, indicated by frogs 902-912, may be selected. In the example of FIG. 9B, frog 906 has been selected, and the other options have been greyed out by controller 60. If the Super Feature™ game has not been triggered, the feature game is played based on the predefined rule. That is, based on the initially set number free games shown in counter 916 and the initial set of multipliers for the selected option. In this case, for frog 906, the feature game will be played with 15 free games and a multiplier selected from one of ×10, ×8 or ×5.

If the Super Feature™ has been triggered, the screen of FIG. 9B is displayed. As shown, selected frog 906 is emphasised by greying out the other options. Those skilled in the art will appreciate that the selected option may be emphasised in other ways, for example by highlighting the selected option or by enlarging frog 906, etc.

In this embodiment, all of the counters 914 are randomly incremented at step 718 by rule modifier 622B, not only the counter for the selected option. Thus progressing from FIG. 9A to FIG. 9B, the counters 914 are incremented as per the following table:

| | Initial No. Free Games (FIG. 9A) | Incremented No. Free Games (FIG. 9B |
|---|---|---|
| Frog 902 | 25 | 37 |
| Frog 904 | 20 | 25 |
| Frog 906 | 15 | 27 |

-continued

| | Initial No. Free Games (FIG. 9A) | Incremented No. Free Games (FIG. 9B |
|---|---|---|
| Frog 908 | 13 | 16 |
| Frog 910 | 10 | 11 |

In other embodiments, only the free game counter applying to the selected option is incremented.

In addition, at steps 722 and 724, one or more multipliers are selected to be deleted by rule modifier 622B. In this example, the multipliers selected for deletion are selected at random from any set of multipliers irrespective of the option selected. Thus multiplier ×3 from frog 904 and multiplier ×5 from frog 906 are selected for deletion, and are removed from the display in FIG. 9B. In that case, the selected option, frog 906, is initiated by controller 60 from applying one of multipliers ×10 or ×8, selected at random.

In other embodiments, multipliers are only deleted from the set of multipliers applying to the selected option. In yet other embodiments, rule modifier 622B selects only the set of multipliers from which to delete a multiplier, rather than an actual multiplier to delete. In such embodiments, a predefined criterion may then be used to select the actual multiplier to delete. For example, rule modifier 622B may be configured to always delete the lowest multiplier from the selected set.

Thus, in the embodiment of FIG. 9B, triggering the Super Feature™ game modifies the standard feature game from 15 free games to 27 free games; and eliminates the multiplier ×5 from the set of multipliers available for selection.

Note also that the first and second components of the mystery choice option, frog 912, in the Super Feature™ game of FIG. 9B have been determined by controller 60 and are displayed alongside the other volatility options, frogs 902-910. In this embodiment, the first and second components of the mystery choice option are selected when any of the frogs are selected in FIG. 9A. In other embodiments, these components may be determined in two stages, for example, the counter 914 and set of multiples 916 may be set to an initial value and modified along with the other volatility options for frogs 902-910. Alternatively, the first and second components may not be determined at all unless it is specifically selected.

In the preferred embodiment, the Super Feature™ game is only be triggerable by eligible players. Eligibility may be determined by paying ante bet in addition to the wager, or may be earned through other means such as loyalty points, in-game achievements or through other trigger events during play of the game. In such embodiments, the Super Feature™ game is guaranteed to have at least one extra benefit above a standard feature game to compensate players for gaining eligibility. For example, rule modifier 622B may be configured to increment each counter 914 by at least one extra free game and/to delete at least the lowest multiplier from the range of multipliers.

Figure 7C:
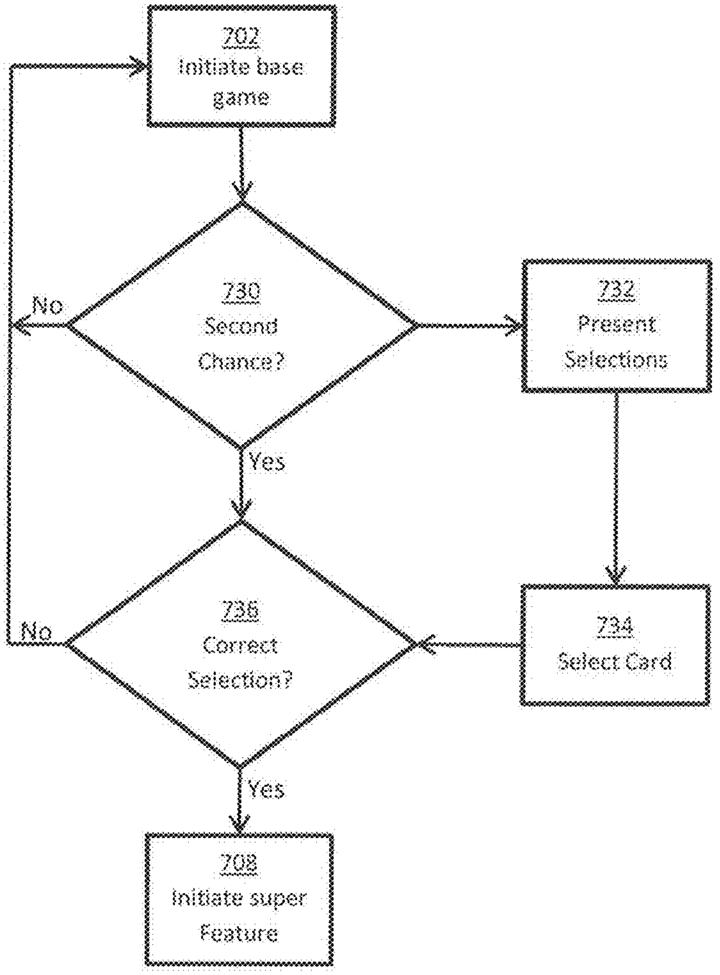
FIG. 7C is a flow diagram of the Super Feature™ game being triggered directly during play of the base game of FIG. 1.

In the above or alternative embodiments, an opportunity to play the Super Feature™ game may also be triggered directly from play of the base game by controller 60, as shown in the flow diagram of FIG. 7C. In such embodiments, RNG 621 is used to generate a random signal which triggers an opportunity to play the Super Feature™ game. One example is by assigning a number to each instance of the base game. For each play of the base game, a random number is then generated by the RNG 641 and, if the randomly generated number matches the assigned number, an opportunity to play the Super Feature™ game is triggered. Another example is by randomly designating a number, or a range of numbers, as a trigger event. When the designated number matches an assigned number of the base game, an opportunity to play the Super Feature™ game is triggered. Of course, the Super Feature™ may also be generated directly from play of the base game using such methods.

Triggering the opportunity to play the Super Feature™ game in this embodiment is termed a "second chance" trigger and is determined at step 730 of FIG. 7C. As mentioned above, the outcome evaluator 623 monitors play of the game, and in this embodiment is also configured to monitor the second chance trigger.

Figure 10:
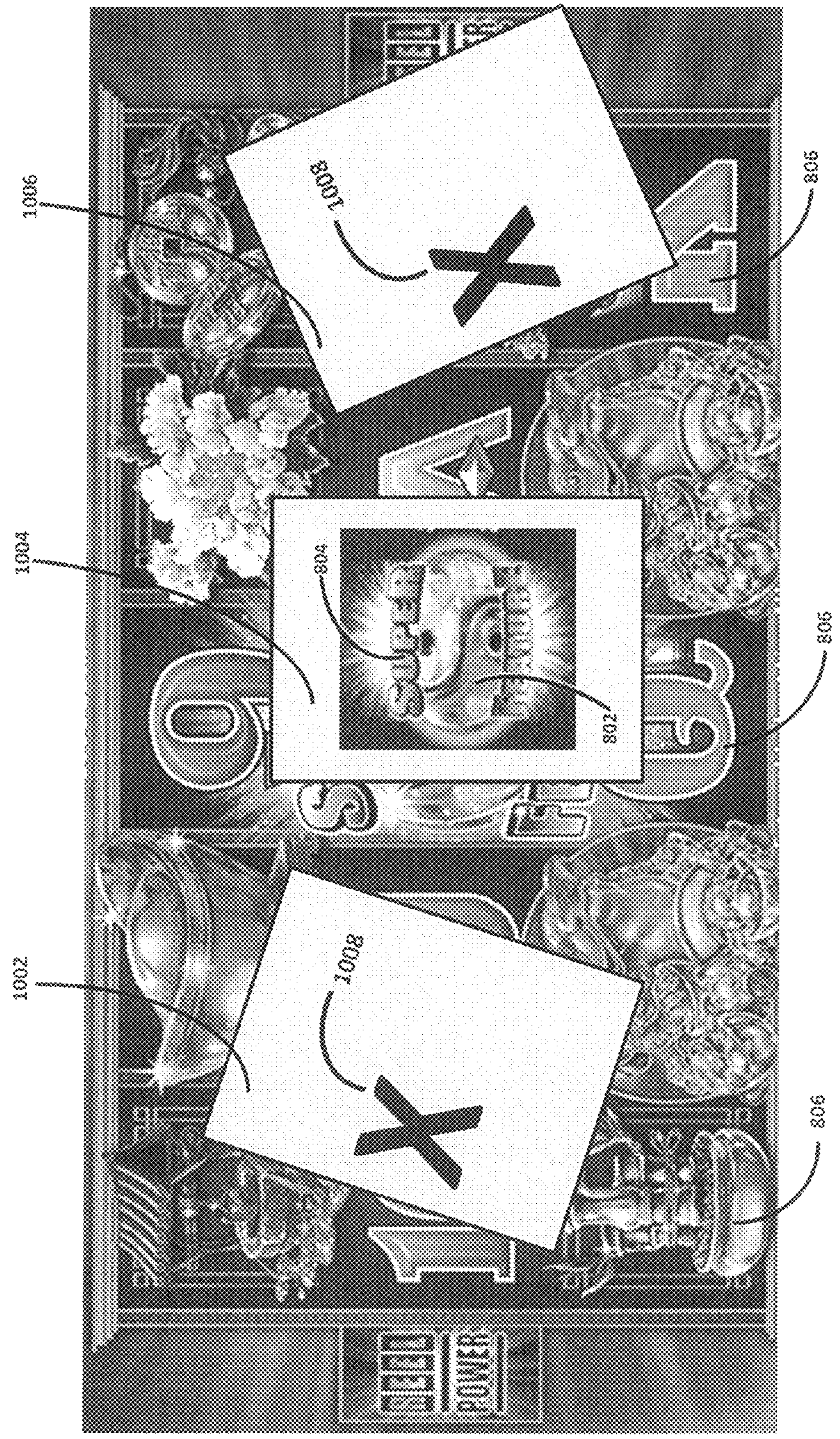
FIG. 10 is a screen representation of the Super Feature™ game of FIG. 8, being triggered by a mechanism independent of the trigger symbols.

If the second chance is not triggered at step 730, the base game continues as normal as described with reference to FIG. 7A. On the other hand, if the second chance is triggered, controller 60 feeds object data from symbol data 642 to display data 625 and causes a plurality of selectively revealable objects to be displayed on display 54, as shown in step 732. In the embodiment of FIG. 10, there are three objects in the form of cards 1002, 1004 and 1006 which are overlaid on top of existing reels 806. Each card is randomly associated with one of either an "X" symbol 1008 or with a composite symbol 1010 composed of yin yang symbol 802 and the super feature overlay 804. The symbols associated with cards 1002, 1004 and 1006 are illustrative only, and may be replaced in other embodiments with any other suitable symbol. Furthermore, in other embodiments, any number of objects may be overlaid upon the existing reels, or may be displayed in another suitable location.

When the cards appear, the symbols 1008, 1008 and 1010 that are respectively associated with cards 1002, 1004 and 1006 are initially concealed such that the associated symbols are not viewable on the display. That is, when the objects appear, the player is only given an opportunity to play the Super Feature™ game. A selection of one of the objects must be made at step 734, and the Super Feature™ game is only triggered when controller 60 determines that a correct selection has been made at step 736.

Once the selection is made, the objects associated with cards 1002, 1004 and 1006 are revealed to indicate whether the Super Feature™ game will be triggered. In the case of the FIG. 10 embodiment, only card 1004 is associated composite symbol 1010. Cards 1002 and 1006 are both associated with X symbol 1008. Therefore, in this embodiment, the Super Feature™ game will only be triggered if card 1004 is selected. Furthermore, in this embodiment controller 60 is configured to reveal all of the associated symbols 1008, 1010 and 1008 once any card 1002, 1004 or 1006 is selected. In other embodiments, only the object associated with the selected card is revealed.

If the Super Feature™ game is triggered at step 736, control passes to step 708 and follows the remainder of FIG. 7B. Once play ends, either through incorrectly selecting the card at step 736 or through the completion of the Super Feature™ game, the player may return to step 702 to once again initiate play of the base game.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further, different parts of the program code can be executed by different devices, for example in a client server relationship. Persons skilled in the art, will appreciate that program code provides a series of instructions executable by the processor.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gaming machine comprising:

a credit input mechanism configured to receive a physical item representing a monetary value for establishing a credit balance, the credit balance being increasable and decreasable based at least on wagering activity;

credit meters configured to monitor the credit balance;

a memory configured to store a set of symbols including a plurality of standard symbols and a trigger symbol;

a symbol selector configured to, in accord with the wagering activity, select a plurality of symbols from the set of symbols for display during play of a base game;

a display configured to display the selected symbols;

an outcome evaluator configured to monitor play of the base game, wherein a feature game is triggered in response to a trigger event including a trigger symbol being displayed during the base game, the feature game having a predefined rule, wherein the predefined rule is defined by a first component comprising a number of free games and a second component comprising an average prize amount; and a rule modifier configured to modify the predefined rule in response to a determination that the predefined rule is to be modified before play of said feature game, including to adjust at least one of the first component and the second component;

a controller configured to initiate play of said feature game based on the modified rule; and wherein the average prize amount for the predefined rule is defined at least in part by a plurality of prize multipliers, and wherein adjusting the average prize amount comprises selectively deactivating at least one of said plurality of prize multipliers; and a payout mechanism configured to provide any award in response to determining that an award is to be made.

2. A gaming machine according to claim 1, and wherein said trigger event comprises a random determination independent of said at least one trigger symbol.

3. A gaming machine according to claim 2 wherein when a random determination independent of the trigger symbol is triggered, a plurality of selectively revealable objects are displayed, at least one of which, when selectively revealed, triggers both said feature game and said modifying of the predefined rule.

4. A gaming machine according to claim 1, and wherein said feature game comprises a plurality of selectable play options, each of the plurality of play options being associated with respective ones of a plurality of predefined rules.

5. A gaming machine according to claim 1, and wherein modifying the first component comprises adjusting the number of free games.

6. A gaming machine comprising:

a credit input mechanism configured to receive a physical item representing a monetary value for establishing a credit balance, the credit balance being increasable and decreasable based at least on wagering activity;

credit meters configured to monitor the credit balance;

a memory configured to store a set of symbols including a plurality of standard symbols and a trigger symbol;

a symbol selector configured to, in accord with the wagering activity, select a plurality of symbols from the set of symbols for display during play of a base game;

a display configured to display the selected symbols;

an outcome evaluator configured to monitor play of the base game, wherein a feature game is triggered in response to a trigger event including a trigger symbol being displayed during the base game, the feature game having a predefined rule; and a rule modifier configured to modify the predefined rule in response to a determination that said at least one predefined rule is to be modified before play of said feature game, wherein said determination is implemented a) randomly after the plurality of symbols have been selected for display, and b) by controlling the display to selectively superimpose at least one overlay symbol over the displayed symbols, wherein said predefined rule is modified in response to said overlay symbol being superimposed over said trigger symbol; and a controller configured to initiate play of said feature game based on the modified rule.

7. A gaming machine according to claim 6 wherein said overlay symbol is only superimposed over a predefined location.

8. A method of gaming for use with a gaming machine having a credit input mechanism configured to receive a physical item representing a monetary value for establishing a credit balance, the credit balance being increasable and decreasable based at least on wagering activity, credit meters configured to monitor the credit balance, a memory configured to store a plurality of symbols, a display, a payout mechanism, and a game controller having a symbol selector, an outcome evaluator, and a rule modifier, the method comprising:

selecting, using the symbol selector, in accord with the wagering activity, a plurality of symbols from the set of symbols for display during play of a base game;

controlling, using the controller, the display to display the selected symbols;

monitoring, using the outcome evaluator, play of the base game, wherein a feature game is triggered in response to a trigger event including a trigger symbol being displayed during the base game, the feature game having a predefined rule; and modifying, using the rule modifier, the predefined rule in response to a determination that said at least one predefined rule is to be modified before play of said feature game, wherein said determination is implemented a) randomly after the plurality of symbols have been selected for display, and b) by controlling the display to selectively superimpose at least one overlay symbol over the displayed symbols, wherein said predefined rule is modified in response to said overlay symbol being superimposed over said at least one trigger symbol; and initiating, using the controller, play of said feature game based on the modified rule.

9. A method of gaming according to claim 8 wherein said trigger event comprises a random determination independent of said at least one trigger symbol.

10. A method of gaming according to claim 9 wherein when a random determination independent of the trigger symbol is triggered, a plurality of selectively revealable objects are displayed, at least one of which, when selectively revealed, triggers both said feature game and said modifying of the predefined rule.

11. A method of gaming according to claim 8 wherein said feature game comprises a plurality of selectable play options, each of the plurality of play options being associated with respective ones of a plurality of predefined rules.

12. A method of gaming according to claim 11 wherein each at least one predefined rule of a feature game are each defined by a first component comprising a number of free games and a second component comprising an average prize amount.

13. A method of gaming according to claim 12 wherein modifying a predefined rule comprises modifying at least one of the first component and the second component.

14. A method of gaming according to claim 13 wherein modifying the first component comprises adjusting the number of free games.

15. A method of gaming according to claim 13 wherein modifying the second component comprises adjusting the average prize amount.

16. A method of gaming according to claim 15 wherein the average prize amount for each predefined rule is defined at least in part by a plurality of prize multipliers, and wherein adjusting the average prize amount comprises selectively deactivating at least one of said plurality of prize multipliers.

17. A method of gaming according to claim 8 wherein said overlay symbol is only superimposed over a predefined location.

* * * * *